US 8,676,392 B2

(12) United States Patent
Arinaga et al.

(10) Patent No.: US 8,676,392 B2
(45) Date of Patent: Mar. 18, 2014

(54) WIND-POWER GENERATION SYSTEM AND OPERATION CONTROL METHOD THEREFOR

(71) Applicants: Shinji Arinaga, Nagasaki (JP); Takatoshi Matsushita, Nagasaki (JP); Tsuyoshi Wakasa, Nagasaki (JP); Akira Yasugi, Nagasaki (JP); Masaaki Shibata, Nagasaki (JP)

(72) Inventors: Shinji Arinaga, Nagasaki (JP); Takatoshi Matsushita, Nagasaki (JP); Tsuyoshi Wakasa, Nagasaki (JP); Akira Yasugi, Nagasaki (JP); Masaaki Shibata, Nagasaki (JP)

(73) Assignee: Mitsubishi Heavy Industries, Ltd., Tokyo (JP)

(*) Notice: Subject to any disclaimer, the term of this patent is extended or adjusted under 35 U.S.C. 154(b) by 0 days.

(21) Appl. No.: 13/709,755

(22) Filed: Dec. 10, 2012

(65) Prior Publication Data
US 2013/0093186 A1  Apr. 18, 2013

Related U.S. Application Data (63) Continuation of application No. 12/673,889, filed as application No. PCT/JP2007/074121 on Dec. 14, 2007, now Pat. No. 8,355,829.

(51) Int. Cl.
*G05D 3/12* (2006.01)
*F03D 9/00* (2006.01)

(52) U.S. Cl.
USPC .............................. 700/287; 700/297; 290/44

(58) Field of Classification Search
USPC .............................. 700/286, 287, 297; 290/44
See application file for complete search history.

(56) References Cited

U.S. PATENT DOCUMENTS

| | | | |
|---|---|---|---|
| 6,724,097 B1 | 4/2004 | Wobben | |
| 7,166,928 B2 | 1/2007 | Larsen | |
| 2004/0164718 A1* | 8/2004 | McDaniel et al. | 323/211 |
| 2005/0040655 A1 | 2/2005 | Wilkins et al. | |
| 2005/0286179 A1* | 12/2005 | Huff et al. | 361/20 |
| 2006/0255594 A1 | 11/2006 | Larsen | |
| 2007/0228838 A1* | 10/2007 | Delmerico et al. | 307/84 |
| 2009/0096211 A1* | 4/2009 | Stiesdal | 290/44 |
| 2011/0112697 A1 | 5/2011 | Arinaga et al. | |

FOREIGN PATENT DOCUMENTS

| | | |
|---|---|---|
| JP | H08-126204 A | 5/1996 |
| JP | H11-041990 A | 2/1999 |
| JP | 2000-078896 A | 3/2000 |
| JP | 2001-268805 A | 9/2001 |
| JP | 2003-511615 A | 3/2003 |
| JP | 2006-226189 A | 8/2006 |
| JP | 2007-267586 A | 10/2007 |

OTHER PUBLICATIONS

Japan Patent Office, "Office Action for JP 2009-546090", Sep. 13, 2011.
Rion Takahashi et al., "A New Control Method for Wind Energy Conversion System Using a Doubly-Fed Synchronous Generator", Feb. 1, 2006, IDE. Transaction of the Institute.

(Continued)

*Primary Examiner* — Sean Shechtman
(74) *Attorney, Agent, or Firm* — Manabu Kanesaka; Kenneth M. Berner; Benjamin J. Hauptman (57) ABSTRACT

An object is to improve the accuracy of power factor adjustment. Power-factor command values corresponding to individual wind turbines are determined by correcting a predetermined power-factor command value for an interconnection node using power factor correction levels set for the individual wind turbines.

13 Claims, 4 Drawing Sheets

(56) References Cited

OTHER PUBLICATIONS

Japan Patent Office, "Decision to Grant a Patent for JP 2009-546090", Jun. 26, 2012.

IP Australia, "Notice of Allowance for AU 2007362452", Dec. 7, 2012.

China Patent Office, "Notice of allowance for CN 200780100901.6," Nov. 6, 2013.

* cited by examiner

WIND-POWER GENERATION SYSTEM AND OPERATION CONTROL METHOD THEREFOR

RELATED APPLICATIONS

The present application is a continuation application of U.S. patent application Ser. No. 12/673,889 filed on Mar. 19, 2010, which is a national phase entry of International Application No. PCT/JP2007/074121 filed on Dec. 14, 2007, the disclosure of which is hereby incorporated by reference herein in its entirety.

TECHNICAL FIELD

The present invention relates to wind-power generation systems and operation control methods therefor.

BACKGROUND ART

In power factor control at an interconnection node of a wind farm, conventionally, a predetermined power-factor command value is determined by, for example, consultation with the grid operator so as to satisfy the range of, for example, a leading power factor of 0.95 to a lagging power factor of 0.95, and generation systems of individual wind turbines perform power factor control so as to maintain the determined predetermined power-factor command. In addition, if the power factor at the interconnection node deviates from the above range despite such control, the power factor at the interconnection node is adjusted by the opening/closing of a capacitor bank or reactors at a substation.

In addition, Patent Citation 1 discloses that a central controller for controlling the power at the interconnection node and so on transmits a uniform reactive power command to the individual wind turbines so that the individual wind turbines perform control based on the reactive power command.

Patent Citation 1:
U.S. Pat. No. 7,166,928, specification

DISCLOSURE OF INVENTION

To increase the voltage stability of a utility grid, the accuracy of power factor adjustment at an interconnection node must be improved. The conventional technique described above, however, is disadvantageous in that the accuracy of power factor adjustment cannot be further improved because a uniform reactive power command value is provided to the individual wind turbines.

An object of the present invention is to provide a wind-power generation system and an operation control method therefor in which the accuracy of power factor adjustment can be improved.

To solve the above problem, the present invention employs the following solutions.

A first aspect of the present invention is an operation control method for a wind-power generation system including a plurality of wind turbines and a central controller for providing control commands to the individual wind turbines, and output powers of the individual wind turbines are supplied to a utility grid via a common interconnection node. Power-factor command values corresponding to the individual wind turbines are determined by correcting a predetermined power-factor command value for the interconnection node using power factor correction levels set for the individual wind turbines.

According to the present invention, because the predetermined power-factor command value for the interconnection node is corrected using the power factor correction levels corresponding to the individual wind turbines, different power-factor command values can be set for the individual wind turbines. This allows power factor control of the individual wind turbines based on appropriate power-factor command values taking into account, for example, the properties related to the individual wind turbines, thus improving the accuracy of power factor control at the grid node.

In the above operation control method for the wind-power generation system, the power factor correction levels may be determined based on reactance components present between the individual wind turbines and the interconnection node.

Thus, because the power-factor command values for the individual wind turbines are determined using the power factor correction levels taking into account the reactance components present between the wind turbines and the interconnection node, the actual power factor at the interconnection node can be efficiently adjusted to the predetermined power-factor command value.

For example, if simple feedback control is performed to adjust the actual power factor at the interconnection node to the power-factor command value without taking into account the reactance components present between the individual wind turbines and the interconnection node, it is possible to adjust the power factors at output ends of generation systems of the individual wind turbines to the power-factor command value provided to the individual wind turbines, although it is difficult to adjust the power factor at the interconnection node to the predetermined power-factor command value. This is because the power factor varies depending on, for example, the reactances of power lines connecting the output ends of the wind turbines to the interconnection node. In this respect, according to the present invention, the power factor at the interconnection node can be controlled efficiently and accurately because the individual wind turbines are controlled based on the power-factor command values taking into account the reactance components present between the individual wind turbines and the interconnection node.

A second aspect of the present invention is an operation control method for a wind-power generation system including a plurality of wind turbines and a central controller for providing control commands to the individual wind turbines, and outputs of the individual wind turbines are supplied to a utility grid via a common interconnection node. If the plurality of wind turbines include both variable-speed wind turbines and fixed-speed wind turbines, the overall power factor of the fixed-speed wind turbines at the interconnection node is calculated, the difference between the calculated power factor and a predetermined power-factor command value for the interconnection node is calculated, the predetermined power-factor command value is corrected using the calculated difference, and power-factor command values for the individual variable-speed wind turbines are determined based on the corrected predetermined power-factor command value.

According to the above method, because the power-factor command values for the variable-speed wind turbines are determined by taking into account variations in power factor due to the fixed-speed wind turbines, the variations in power factor due to the fixed-speed wind turbines can be absorbed by power factor control of the variable-speed wind turbines. This improves the accuracy of power factor control at the interconnection node even if fixed-speed wind turbines and variable-speed wind turbines are both present.

In the above operation control method for the wind-power generation system, the power-factor command values corresponding to the individual variable-speed wind turbines may be determined by correcting the corrected predetermined power-factor command value using power factor correction levels set for the individual variable-speed wind turbines.

Thus, because the power-factor command values for the individual variable-speed wind turbines are determined by further correcting the predetermined power-factor command value for the interconnection node, corrected by taking into account the variations in the power factors of the fixed-speed wind turbines, using the power factor correction levels set for the individual variable-speed wind turbines, different power-factor command values can be set for the individual variable-speed wind turbines. This allows power factor control of the individual variable-speed wind turbines based on appropriate power-factor command values taking into account, for example, the properties related to the individual variable-speed wind turbines, thus further improving the accuracy of power factor control at the interconnection node.

In the above operation control method for the wind-power generation system, the power factor correction levels corresponding to the individual variable-speed wind turbines may be determined based on reactance components present between the individual variable-speed wind turbines and the interconnection node.

Thus, because the power-factor command values for the individual variable-speed wind turbines are determined by taking into account the reactance components present between the wind turbines and the interconnection node, the actual power factor at the interconnection node can be efficiently adjusted to the power-factor command value.

A third aspect of the present invention is a wind-power generation system including a plurality of wind turbines and a central controller for providing control commands to the individual wind turbines, and output powers of the individual wind turbines are supplied to a utility grid via a common interconnection node. Power-factor command values corresponding to the individual wind turbines are determined by correcting a predetermined power-factor command value for the interconnection node using power factor correction levels set for the individual wind turbines.

A fourth aspect of the present invention is a wind-power generation system including a plurality of wind turbines and a central controller for providing control commands to the individual wind turbines, and outputs of the individual wind turbines are supplied to a utility grid via a common interconnection node. If the plurality of wind turbines include both variable-speed wind turbines and fixed-speed wind turbines, the central controller calculates the overall power factor of the fixed-speed wind turbines at the interconnection node, calculates the difference between the calculated power factor and a predetermined power-factor command value for the interconnection node, corrects the predetermined power-factor command value using the calculated difference, and determines power-factor command values for the individual variable-speed wind turbines based on the corrected predetermined power-factor command value.

The present invention provides the advantage of improving the accuracy of power factor adjustment.

EXPLANATION OF REFERENCE

1: wind-power generation system
10: central controller
20: generation system
30: power line
WTG1, WTG2, WTGn: wind turbine

BEST MODE FOR CARRYING OUT THE INVENTION

Individual embodiments of wind-power generation systems and operation control methods therefor according to the present invention will be described below with reference to the drawings.

First Embodiment

Figure 1:
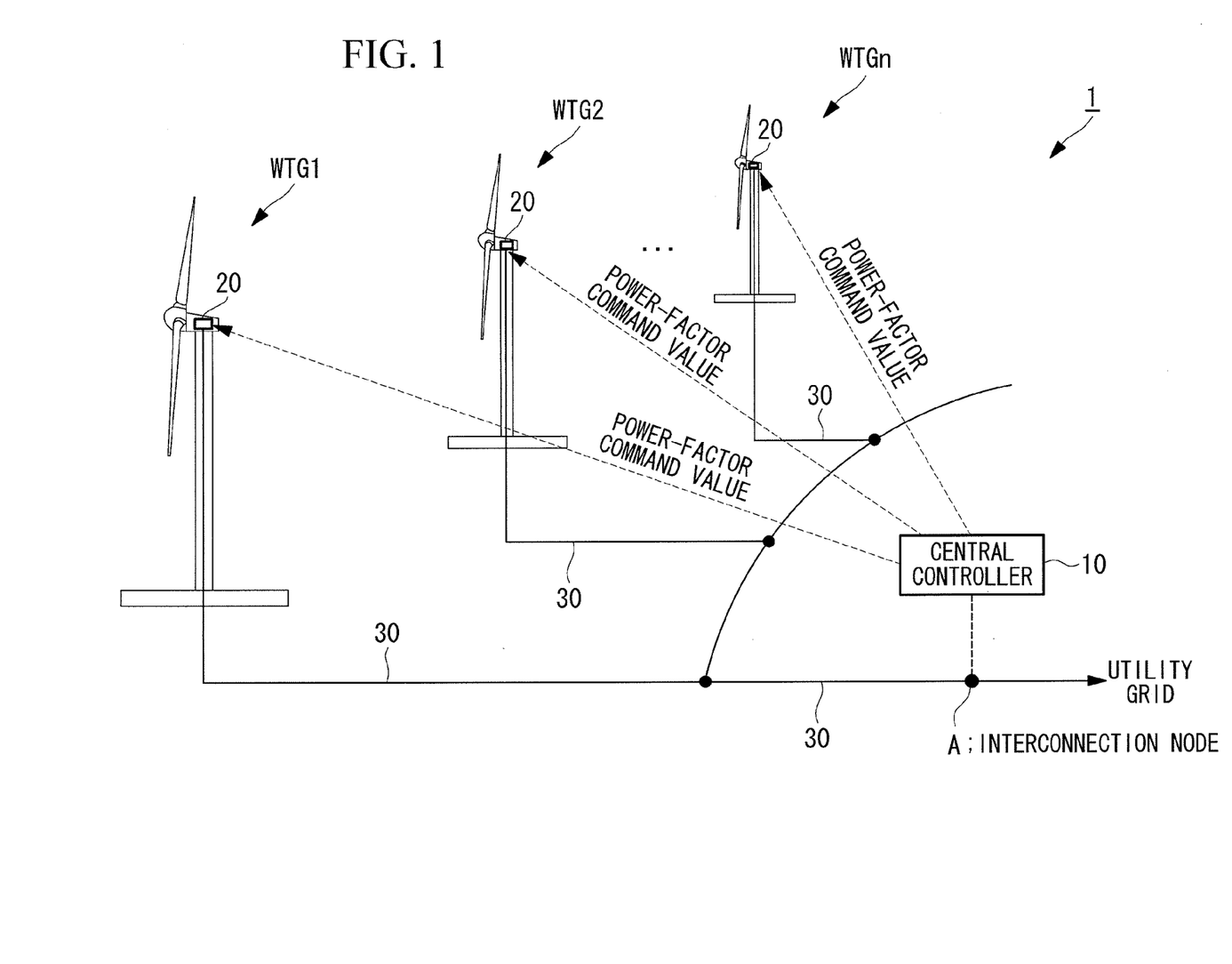
FIG. 1 is a diagram showing the entire configuration of a wind-power generation system according to a first embodiment of the present invention.

FIG. 1 is a block diagram showing the entire configuration of a wind-power generation system according to this embodiment. As shown in FIG. 1, a wind-power generation system 1 includes a plurality of wind turbines WTG1, WTG2, ..., WTGn (hereinafter denoted simply by the reference sign "WTG" when all wind turbines are referred to and denoted by the reference signs "WTG1", "WTG2", etc. when the individual wind turbines are referred to) and a central controller 10 for providing control commands to the individual wind turbines WTG. In this embodiment, all wind turbines WTG are variable-speed wind turbines.

Each wind turbine WTG includes a generation system 20. The generation system 20 includes, as the main configuration thereof, for example, a generator, a variable-frequency converter excitation system capable of controlling the active power and the reactive power of the generator, and a wind turbine controller for providing a power command value to the variable-frequency converter excitation system.

The powers output from the generation systems 20 of the individual wind turbines are supplied through respective power lines 30 to a utility grid via a common interconnection node A.

The central controller 10 sets a power-factor command value for the interconnection node A based on a requested-power-factor command for the interconnection node A provided from a power management room managing grid power (for example, an electric utility). The power-factor command value is corrected using power factor correction levels set for the individual wind turbines WTG1, WTG2, ..., WTGn, and the corrected power-factor command values are transmitted to the respective wind turbines. Here the details of the power factor correction levels set for the individual wind turbines will be described later.

The generation system 20 of each wind turbine WTG1, WTG2, ..., WTGn sets an active-power command value and a reactive-power command value so as to satisfy the power-factor command value provided from the central controller 10. Specifically, the wind turbine controller of the generation system 20 monitors the rotational speed of the generator to set an active-power command value corresponding to the rotational speed. In addition, a reactive-power command value satisfying the power-factor command value is determined from the active-power command value and the relational expression shown in equation (1) below. At this time, the wind turbine controller sets the reactive-power command value within the operating range depending on thermal constraints and voltage limitations. In addition, if the power-factor command is given priority, the setting may be such that the necessary reactive power is supplied by reducing the active power.

[Equation 1]

$$\text{Power factor} = \frac{P}{\sqrt{P^2 + Q^2}} \quad (1)$$

In equation (1) above, P is the active power, and Q is the reactive power.

The wind turbine controller provides the set active-power command value and the set reactive-power command value to the variable-frequency converter excitation system. The variable-frequency converter excitation system controls the generator based on the active-power command value and the reactive-power command value provided from the wind turbine controller.

With the above power factor control, active powers and reactive powers satisfying the power-factor command values provided to the individual wind turbines are output from the respective wind turbines WTG and are supplied to the common interconnection node A through the power lines 30.

Next, the power factor correction levels set for the individual wind turbines WTG1, WTG2, ..., WTGn described above will be described in detail.

The above power factor correction levels are determined based on reactance components present between the individual wind turbines WTG1, WTG2, ..., WTGn and the interconnection node A. In a wind farm having many wind turbines, for example, the lengths of the power lines 30 connecting the individual wind turbines WTG1, WTG2, ..., WTGn and the interconnection node A differ largely. Accordingly, the powers output from the wind turbines are affected by the reactances corresponding to the distances over the respective power lines 30 before reaching the interconnection node A.

As a result, for example, if a uniform power-factor command value is provided to the individual wind turbines, variations in the reactive power at the interconnection node A can occur and decrease the power factor accuracy. In that respect, this embodiment takes into account the power variations, described above, due to the reactance components of the power lines 30 to correct the power-factor command value provided to the individual wind turbines using the power factor correction levels corresponding to the individual wind turbines, more specifically, the reactance components of the power lines 30 connecting the individual wind turbines and the interconnection node A.

Figure 2:
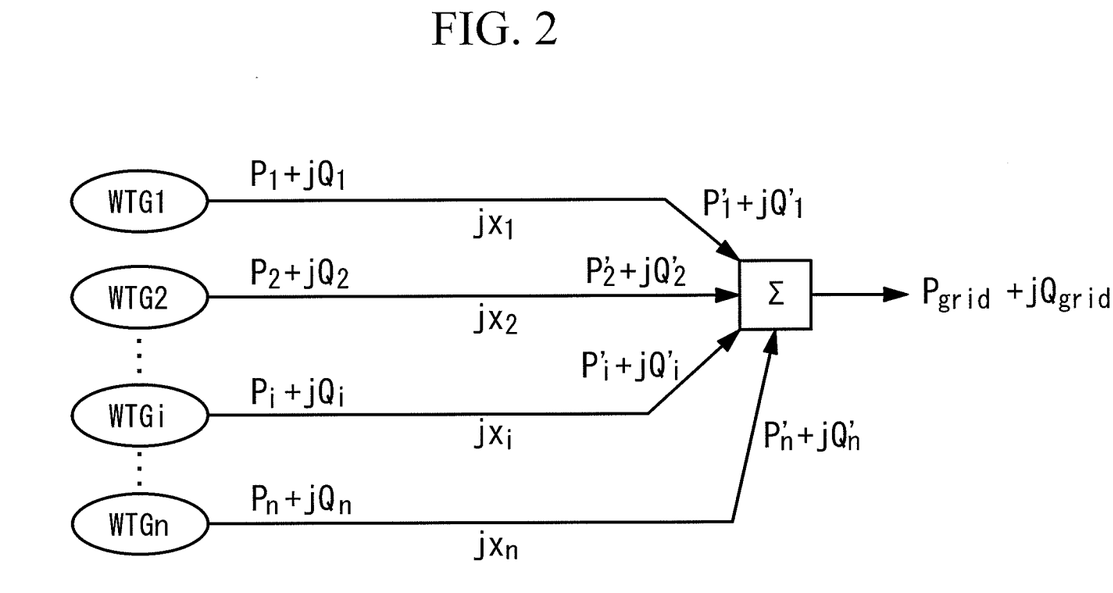
FIG. 2 is a diagram illustrating power factor correction levels according to the first embodiment of the present invention.

First, as shown in FIG. 2, let the powers at the output ends of the individual wind turbines WTG1, WTG2, ..., WTGi, ..., WTGn be $P_1+jQ_1$, $P_2+jQ_2$, ..., $P_i+jQ_i$, ..., $P_n+jQ_n$, respectively. In addition, let the reactances of the power lines between the individual wind turbines WTG1, WTG2, ..., WTGn and the interconnection node A be $jx_1$, $jx_2$, ..., $jx_i$, ..., $jx_n$, respectively, and the powers of the individual wind turbines at the interconnection node A are defined as $P_1'+jQ_1'$, $P_2'+jQ_2'$, ..., $P_i'+jQ_i'$, ..., $P_n'+jQ_n'$, respectively.

Next, power flow calculation is performed for each wind turbine. Here the i-th wind turbine will be described as an example. For convenience, let interconnection node voltage $V_{grid}=1$ pu and phase angle $\delta_{grid}=0$. In addition, let the direction from each wind turbine toward the interconnection node A be positive in sign for both the active power P and the reactive power Q. The sign of the power factor also corresponds thereto; for example, power factor pf>0 if P>0 and Q>0, and power factor pf<0 if P>0 and Q<0.

Under such conditions, the active power $P_i$ and the reactive power $Q_i$ at the output end of the wind turbine WTGi and the active power $P_i'$ and the reactive power $Q_i'$ at the interconnection node A are represented, respectively, as follows.

[Equation 2]

$$\left. \begin{array}{l} P_i = \dfrac{1}{x_i} V_i \sin\delta_i \\[4pt] P_i' = \dfrac{1}{x_i} V_i \sin\delta_i \\[4pt] Q_i = +\dfrac{1}{x_i} V_i^2 - \dfrac{1}{x_i} V_i \cos\delta_i \\[4pt] Q_i' = -\dfrac{1}{x_i} V_i \cos\delta_i + \dfrac{1}{x_i} \end{array} \right\} \quad (2)$$

In this power flow calculation, the active powers have the same value, namely, $P_i = P_i'$, because only the reactance components of the power lines 30 are taken into account. Letting $P_i$ and $Q_i$ be known, $P_i'$ and $Q_i'$ can be solved from equation (2) above.

As $P_i$ and $Q_i$, appropriate values (for example, averages) are set by, for example, acquiring the active power $P_i$ and the reactive power $Q_i$ at the output end of the wind turbine over a past predetermined period of time (for example, one month, three months, or one year) and analyzing the acquired data.

The power factor $pf_i$ at the output end of the wind turbine is represented by equation (3) below, and the power factor $pf_i'$ at the interconnection node A is represented by equation (4) below.

[Equation 3]

$$pf_i = \frac{P_i}{\sqrt{P_i^2 + Q_i^2}} \quad (3)$$

$$pf_i' = \frac{P_i'}{\sqrt{P_i'^2 + Q_i'^2}} \quad (4)$$

As a result, the power factor correction level $\Delta pf_i$ for the i-th wind turbine can be determined by equation (5) below:

$$\Delta pf_i = pf_{grid} - pf_i' \quad (5)$$

In equation (5) above, $pf_{grid}$ is the power-factor command value for the interconnection node A.

The power factor correction levels $\Delta pf_i$ determined for the individual wind turbines by the method described above are stored in a memory of the central controller 10 in association with the respective wind turbines and are used for correction of the power-factor command value in the operation of the wind turbines.

The above power factor correction levels stored in the memory may be updated, for example, at predetermined time intervals (for example, every one year or three months). For updating, the active powers $P_i$ and the reactive powers $Q_i$ of the wind turbines may be set to appropriate values (for example, as described above, set using the analytical results of data over a past predetermined period of time), and these values may be substituted into the above equations to update the power factor correction levels for the individual wind turbines.

Next, an operation control method for the wind-power generation system having the above configuration will be described.

First, upon acquisition of the power-factor command value $pf_{grid}$ for the interconnection node (Step SA1 in FIG. 3), the central controller 10 reads the power factor correction levels $\Delta pf_i$ corresponding to the individual wind turbines WTG1, WTG2, . . . , WTGn from the memory and corrects the power-factor command value $pf_{grid}$ using the power factor correction levels $\Delta pf_i$ (Step SA2). The corrected power-factor command values $pf_i$ ($=pf_{grid}+\Delta pf_i$) are transmitted to the respective wind turbines WTG1, WTG2, . . . , WTGn (Step SA3).

Figure 3:
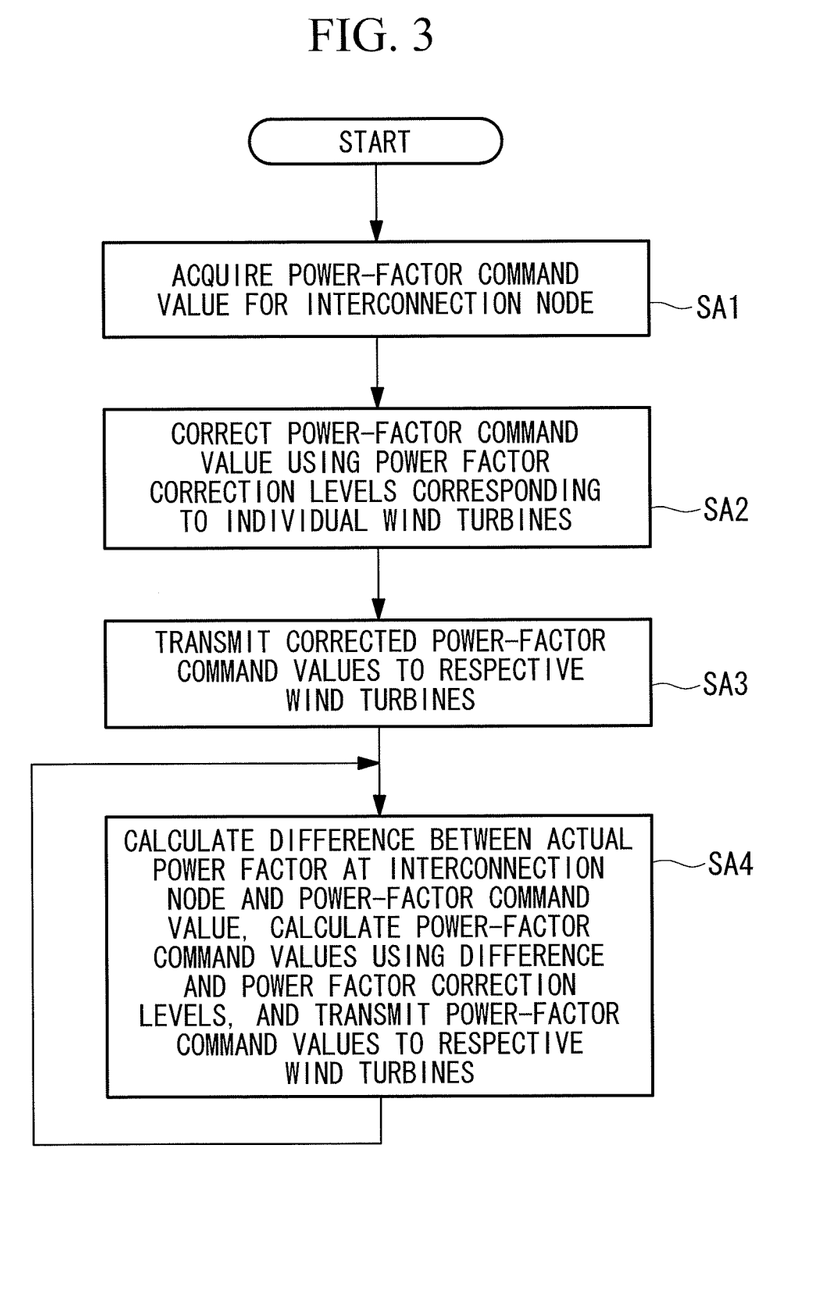
FIG. 3 is a flowchart showing a procedure of an operation control method for the wind-power generation system according to the first embodiment of the present invention.

The wind turbine controllers of the individual wind turbines WTG1, WTG2, . . . , WTGn set active-power command values and reactive-power command values so as to satisfy the respective power-factor command values $\Delta pf_1$, $\Delta pf_2$, . . . , $\Delta pf_i$, . . . , $\Delta pf_n$ received from the central controller 10 and provide the set active-power command values and the set reactive-power command values to the variable-frequency converter excitation systems. The variable-frequency converter excitation systems control the generators based on the provided active-power command values and the provided reactive-power command values. Thus, the active powers and the reactive powers satisfying the power-factor command values corresponding to the individual wind turbines are output from the respective wind turbines and are supplied to the common interconnection node A through the power lines 30.

The central controller 10 detects the reactive power and the active power at the interconnection node A to calculate the actual power factor $pf_{grid}'$ from the detected values. The difference between the calculated actual power factor $pf_{grid}'$ and the power-factor command value $pf_{grid}$ is then calculated, and new power-factor command values are calculated so as to offset that difference and are provided as the next power-factor command values to the respective wind turbines (Step SA4).

The new power-factor command values are determined by further adding the difference between the actual power factor $pf_{grid}'$ and the power-factor command value $pf_{grid}$ and the power factor correction levels $\Delta pf_i$ to the power-factor command value $pf_{grid}$, as in equation (6) below.

$$pf_i = pf_{grid} + \Delta pf_i + (pf_{grid} - pf_{grid}') \quad (6)$$

The power-factor command values corresponding to the individual wind turbines may be calculated thereafter by detecting the actual power factor at the interconnection node A at predetermined time intervals and substituting the difference in power factor determined from the detection results, namely, $\Delta pf_{grid} = pf_{grid} - pf_{grid}'$, and the power factor correction levels $\Delta pf_i$ into equation (6) above.

In this way, feedback control can be performed to stabilize the power factor at the interconnection node A.

As described above, because the wind-power generation system 1 and the operation control method therefor according to this embodiment determine power-factor command values appropriate for the individual wind turbines by correcting the power-factor command value for the interconnection node A using the power factor correction levels corresponding to the reactances present between the individual wind turbines and the interconnection node A, power factor control taking into account the reactances related to the power lines 30 can be performed in the individual wind turbines. This improves the accuracy of power factor control at the interconnection node A.

Second Embodiment

Figure 4:
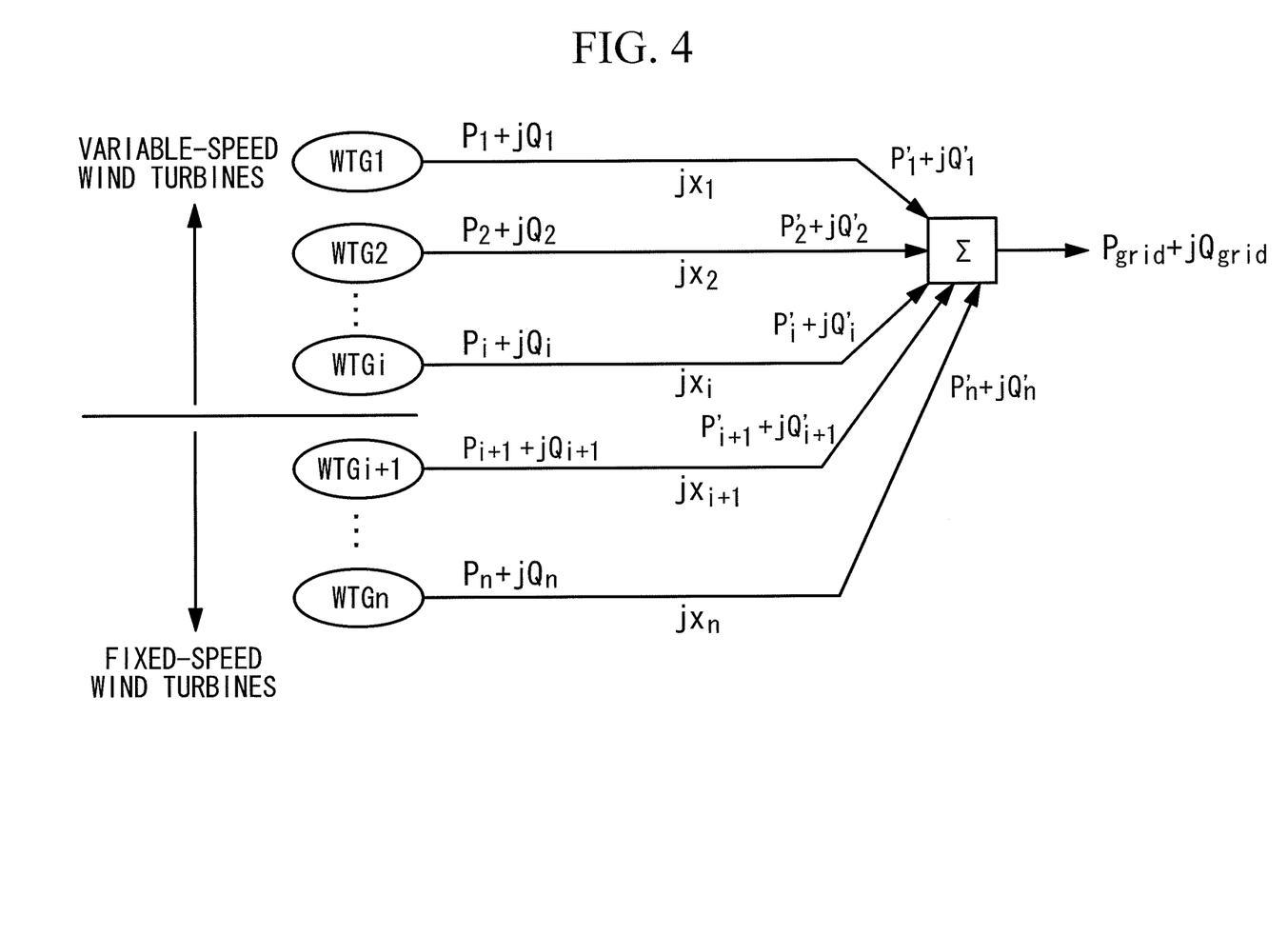
FIG. 4 is a diagram illustrating an operation control method for a wind-power generation system according to a second embodiment of the present invention.

Next, a second embodiment of the present invention will be described using FIG. 4.

While the case where all wind turbines are variable-speed wind turbines has been described in the first embodiment described above, the case where some wind turbines are fixed-speed wind turbines will be described in this embodiment.

A wind-power generation system according to this embodiment includes at least one fixed-speed wind turbine and at least one variable-speed wind turbine. As shown in FIG. 4, for example, the first to i-th wind turbines are variable-speed wind turbines, whereas the i+1-th to n-th wind turbines are fixed-speed wind turbines. In this case, first, the active powers $P_i'$ and the reactive powers $Q_i'$ at the interconnection node A are determined by power flow calculation based on the same procedure as in the first embodiment described above.

Subsequently, the sums of the active powers and the reactive powers of the fixed-speed wind turbines alone at the interconnection node A are determined as shown in equations (7) and (8) below.

[Equation 4]

$$P_{fix}' = \sum_{i=i+1}^{n} P_i' \quad (7)$$

$$Q_{fix}' = \sum_{i=i+1}^{n} Q_i' \quad (8)$$

Subsequently, the above sums of the active powers and the reactive powers are used to calculate the overall power factor $pf_{fix}'$ of the fixed-speed wind turbines.

[Equation 5]

$$pf_{fix}' = \frac{P_{fix}'}{\sqrt{P_{fix}'^2 + Q_{fix}'^2}}$$

Next, the difference between the power-factor command value for the interconnection node A and the above overall power factor $pf_{fix}'$ of the fixed-speed wind turbines is calculated.

$$\Delta pf = pf_{grid} - pf_{fix}' \quad (9)$$

To absorb that difference in the variable-speed wind turbines, $\Delta pf$ is set as a command value correction level, and a value obtained by adding the command value correction level $\Delta pf$ to the above power-factor command value $pf_{grid}$ is set as a new power-factor command value. Based on the power-factor command value, as in the first embodiment described above, the power-factor command values for the individual wind turbines are determined using the power factor correction levels $\Delta pf_1$, $\Delta pf_2$, . . . , $\Delta pf_i$ corresponding to the individual variable-speed wind turbines WTG1, WTG2, . . . , WTGi, and the corrected power-factor command values are transmitted to the respective wind turbines.

As described above, if fixed-speed wind turbines and variable-speed wind turbines are both present, because the wind-power generation system and the operation control method therefor according to this embodiment determine power-factor command values for the variable-speed wind turbines by taking into account variations in the power factors of the fixed-speed wind turbines, the variable-speed wind turbines can absorb the variations in power factor due to the fixed-speed wind turbines. This improves the accuracy of power factor control even if fixed-speed wind turbines are included.

In this embodiment, the overall power factor of the fixed-speed wind turbines is determined and is used to correct the power-factor command value for the interconnection node A, and the corrected power-factor command value is further corrected using the power factor correction levels $\Delta pf_i$ set for the individual variable-speed wind turbines; instead, for example, the power-factor command value corrected using the overall power factor of the fixed-speed wind turbines may be provided as a power-factor command value for the individual variable-speed wind turbines. Although in this case variations in power factor due to reactors present between the individual variable-speed wind turbines and the interconnection node A are not offset, a considerable advantage can be achieved in that the variations in power factor due to the fixed-speed wind turbines can be offset.

Although the embodiments of the present invention have been described above in detail with reference to the drawings, specific configurations are not limited to those of the embodiments; design changes etc. are encompassed without departing from the spirit of the present invention.

For example, although the central controller 10 corrects the power-factor command value in the embodiments described above, the power-factor command value may instead be corrected, for example, in the individual wind turbines. In this case, a uniform power-factor command value is transmitted from the central controller 10 to the individual wind turbines, and the power-factor command value received from the central controller 10 is corrected in the individual wind turbines using the respective power factor correction levels possessed by the individual wind turbines.

In addition, although the corrected power-factor command values etc. are transmitted from the central controller 10 by communication in this embodiment, a configuration may be employed in which, for example, the operator manually inputs and sets the power-factor command values to the respective wind turbines.

The invention claimed is:

1. An operation control method for a wind-power generation system comprising a plurality of individual wind turbines and a central controller for providing control commands to the individual wind turbines, output powers of the individual wind turbines being supplied to a utility grid via a common interconnection node, the operation control method comprising:
a step of calculating power factor correction levels corresponding to the individual wind turbines on a basis of reactance components present between the individual wind turbines and the interconnection node;
a step of storing the calculated power factor correction levels in association with the individual wind turbines in a memory;
a step of detecting a reactive power and an active power at the interconnection node;
a step of calculating an actual power factor at the interconnection node using the detected reactive power and the detected active power;
a step of calculating a difference between the calculated actual power factor and a predetermined power-factor command value for the interconnection node;
a step of obtaining the power factor correction levels in association with the individual wind turbines from the memory; and
a step of determining power-factor command values corresponding to the individual wind turbines by correcting the predetermined power-factor command value for the interconnection node using the calculated difference and the power factor correction levels obtained from the memory.

2. The operation control method according to claim 1, wherein the power factor is expressed by following equation $$\text{Power factor} = \frac{P}{\sqrt{P^2 + Q^2}}, \quad (1)$$

wherein P is an active power and Q is a reactive power.

3. The operation control method according to claim 2, wherein the active power and the reactive power at an output end of a wind turbine among the plurality of the wind turbines and another active power and another reactive power at the interconnection node are expressed by following equations $$\left. \begin{array}{l} P_i = \dfrac{1}{x_i} V_i \sin\delta_i \\[4pt] P_i' = \dfrac{1}{x_i} V_i \sin\delta_i \\[4pt] Q_i = +\dfrac{1}{x_i} V_i^2 - \dfrac{1}{x_i} V_i \cos\delta_i \\[4pt] Q_i' = -\dfrac{1}{x_i} V_i \cos\delta_i + \dfrac{1}{x_i} \end{array} \right\}, \quad (2)$$

wherein
i is a number of the wind turbine,
$x_i$ is reactance components present between the individual wind turbines and the interconnection node,
V is a voltage,
$P_i$ is the active power at an output end of the wind turbine,
$P_i'$ is the another active power at the interconnection node,
$Q_i$ is the reactive power at the output end of the wind turbine, and
$Q_i'$ is the another reactive power at the interconnection node
when
an interconnection node voltage $V_{grid}=1$ pu,
a phase angle $\delta_{grid}=0$,
a direction from each wind turbine toward the interconnection node is positive in sign for both the active power P and the reactive power Q, and
the sign of the power factor is
power factor pf>0 if P>0 and Q>0 and
power factor pf<0 if P>0 and Q<0.

4. The operation control method according to claim 3, wherein
a power factor $pf_i$ at the output end of the wind turbine is represented by following equation $$pf_i = \frac{P_i}{\sqrt{P_i^2 + Q_i^2}}, \quad (3)$$

and another power factor $pf_i'$ at the interconnection node is represented by following equation $$pf_i' = \frac{P_i'}{\sqrt{P_i'^2 + Q_i'^2}}. \quad (4)$$

5. The operation control method according to claim 4, wherein the power factor correction level $\Delta pf_i$ is determined by following equation $$\Delta pf_i = pf_{grid} - pf_i' \quad (5),$$

wherein $pf_{grid}$ is the power-factor command value for the interconnection node.

6. The operation control method according to claim 5, wherein the power-factor command value is determined as the power factor $pf_i$ by adding a difference between the actual power factor $pf_{grid}'$ and the power-factor command value $pf_{grid}$, and the power factor correction level $\Delta pf_i$ to the power-factor command value $pf_{grid}$, as expressed by following equation $$pf_i = pf_{grid} + \Delta pf_i + (pf_{grid} - pf_{grid}') \quad (6).$$

7. A wind-power generation system comprising a plurality of individual wind turbines and a central controller for providing control commands to the individual wind turbines, output powers of the individual wind turbines being supplied to a utility grid via a common interconnection node, the wind-power generation system,
wherein the central controller includes a memory for storing power factor correction levels in association with the individual wind turbines, the power factor correction levels being determined based on reactance components present between the individual wind turbines and the interconnection node; and
wherein the central controller
calculates an actual power factor at the interconnection node using a detected reactive power and a detected active power at the interconnection node;
calculates a difference between the calculated actual power factor and a predetermined power-factor command value for the interconnection node;
determines power-factor command values corresponding to the individual wind turbines by correcting the predetermined power-factor command value for the interconnection node using the calculated difference and the power factor correction levels obtained from the memory, and
transfers each of the power-factor command values to the corresponding individual wind turbines.

8. The wind-power generation system according to claim 7, wherein the power factor is expressed by following equation $$\text{Power factor} = \frac{P}{\sqrt{P^2 + Q^2}}, \quad (1)$$

wherein P is the active power and Q is the reactive power.

9. The wind-power generation system according to claim 7, wherein the active power and the reactive power at an output end of a wind turbine among the plurality of the wind turbines and another active power and another reactive power at the interconnection node are expressed by following equations $$\left.\begin{aligned} P_i &= \frac{1}{x_i} V_i \sin\delta_i \\ P_i' &= \frac{1}{x_i} V_i \sin\delta_i \\ Q_i &= +\frac{1}{x_i} V_i^2 - \frac{1}{x_i} V_i \cos\delta_i \\ Q_i' &= -\frac{1}{x_i} V_i \cos\delta_i + \frac{1}{x_i} \end{aligned}\right\}, \quad (2)$$

wherein
i is a number of the wind turbine,
$x_i$ is reactance components present between the individual wind turbines and the interconnection node,
V is a voltage,
$P_i$ is the active power at an output end of the wind turbine,
$P_i'$ is the another active power at the interconnection node,
$Q_i$ is the reactive power at the output end of the wind turbine, and
$Q_i'$ is the another reactive power at the interconnection node
when
an interconnection node voltage $V_{grid}=1$ pu,
a phase angle $\delta_{grid}=0$,
a direction from each wind turbine toward the interconnection node is positive in sign for both the active power P and the reactive power Q, and
the sign of the power factor is
power factor pf>0 if P>0 and Q>0 and
power factor pf<0 if P>0 and Q<0.

10. The wind-power generation system according to claim 9, wherein
a power factor $pf_i$ at the output end of the wind turbine is represented by following equation $$pf_i = \frac{P_i}{\sqrt{P_i^2 + Q_i^2}}, \quad (3)$$

and another power factor $pf_i'$ at the interconnection node is represented by following equation $$pf_i' = \frac{P_i'}{\sqrt{P_i'^2 + Q_i'^2}}. \quad (4)$$

11. The wind-power generation system according to claim 10, wherein the power factor correction level $\Delta pf_i$ is determined by following equation $$\Delta pf_i = pf_{grid} - pf_i' \quad (5),$$

wherein $pf_{grid}$ is the power-factor command value for the interconnection node.

12. The wind-power generation system according to claim 11, wherein the power-factor command value is determined as the power factor $pf_i$ by adding a difference between the actual power factor $pf_{grid}'$ and the power-factor command value $pf_{grid}$, and the power factor correction level $\Delta pf_i$ to the power-factor command value $pf_{grid}$, as expressed by following equation $$pf_i = pf_{grid} + \Delta pf_i + (pf_{grid} - pf_{grid}') \qquad (6).$$

13. The wind-power generation system according to claim 7, wherein the power factor correction levels stored in the memory are updated at predetermined time intervals.

* * * * *